(12) United States Patent
Peterson (10) Patent No.: US 8,593,428 B1
(45) Date of Patent: Nov. 26, 2013

(54) RADIAL TRACK-PAD SYSTEM AND METHOD

(75) Inventor: Jon Peterson, Everett, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1601 days.

(21) Appl. No.: 11/821,414

(22) Filed: Jun. 22, 2007

(51) Int. Cl.
*G06F 3/045* (2006.01)

(52) U.S. Cl.
USPC ........... 345/174; 345/156; 345/170; 345/173; 324/686

(58) Field of Classification Search
USPC .................................................. 345/170–181
See application file for complete search history.

(56) References Cited

U.S. PATENT DOCUMENTS

| | | | | |
|---|---|---|---|---|
| 5,780,749 A | * | 7/1998 | Okada | 73/862.043 |
| 5,949,325 A | * | 9/1999 | Devolpi | 338/154 |
| 6,288,707 B1 | * | 9/2001 | Philipp | 345/168 |
| 6,378,381 B1 | * | 4/2002 | Okada et al. | 73/862.043 |
| 6,958,614 B2 | * | 10/2005 | Morimoto | 324/661 |
| 7,046,230 B2 | * | 5/2006 | Zadesky et al. | 345/156 |
| 7,075,527 B2 | * | 7/2006 | Takagi et al. | 345/184 |
| 2005/0270039 A1 | * | 12/2005 | Mackey | 324/660 |
| 2007/0257890 A1 | * | 11/2007 | Hotelling et al. | 345/173 |

\* cited by examiner

*Primary Examiner* — Grant Sitta (57) ABSTRACT

Systems and methods for track-pad input are disclosed. In one embodiment, a track-pad device includes a center sensor and a plurality of radial sensors. The center sensor senses electrical characteristic change at a center of the track-pad device. The plurality of radial sensors sense electrical characteristic changes in the respective vicinity of each of the plurality of radial sensors. The plurality of radial sensors can be configured in concentric rings about the center sensor.

18 Claims, 8 Drawing Sheets

RADIAL TRACK-PAD SYSTEM AND METHOD

TECHNICAL FIELD

Embodiments of the present invention relate to the field of information input.

BACKGROUND

The following descriptions are not admitted to be prior art by virtue of their inclusion in this section.

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. A number of the systems utilize devices for interacting with the system including inputting information. However, traditional input approaches can be susceptible to a number of reliability and/or accuracy issues.

Figure 1:
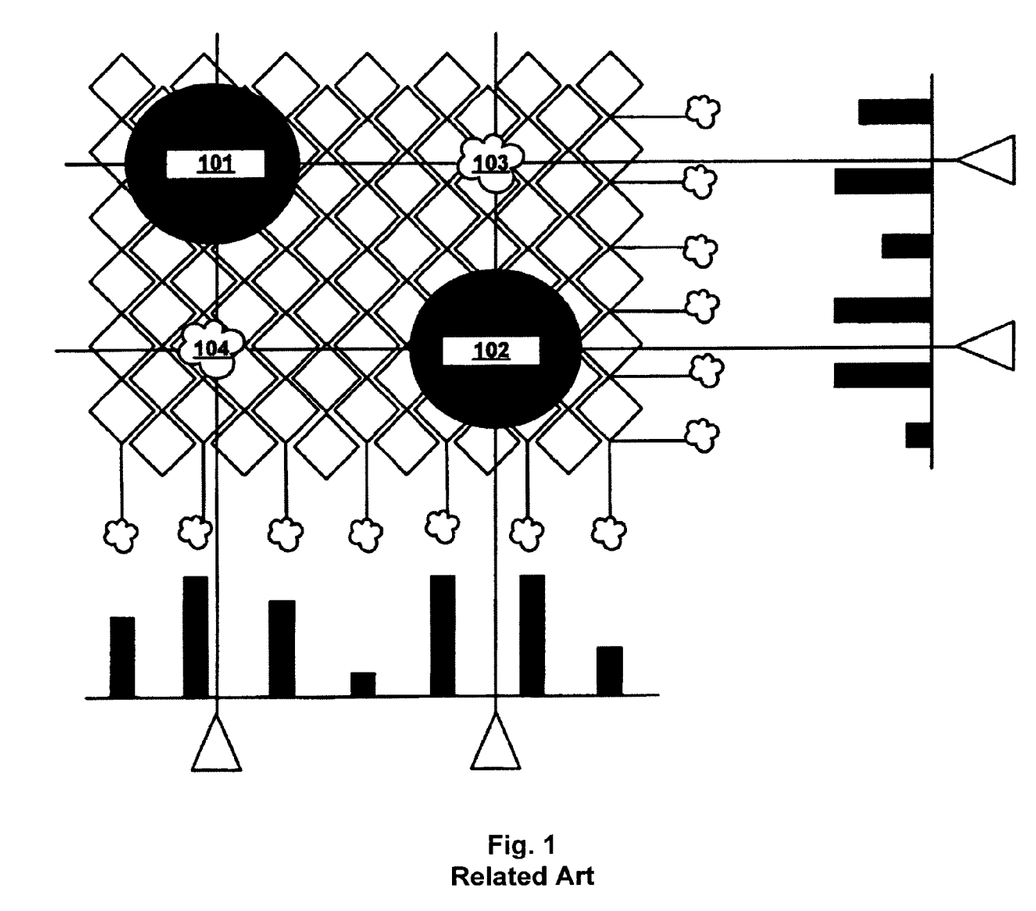
FIG. 1 is a block diagram of a conventional track-pad showing multiple activators and phantom indicators or centroid positions.

Conventional track-pad input is usually limited to resolving one input and is susceptible to erroneous input. Traditional track-pads are typically limited to resolving a single X and Y position for a given finger activation location. Multiple activators can cause difficulties and inaccuracies. For example, if multiple activators come into contact with a conventional track-pad the track-pad can report phantom locations and the input can often be corrupted. FIG. 1 is a block diagram of a conventional track-pad showing multiple activators 101 and 102 and phantom indicators or centroid positions 103 and 104. The phantoms can occur as a result of the processing algorithm.

SUMMARY

Systems and methods for track-pad input are disclosed. In one embodiment, a track-pad device includes a center sensor and a plurality of radial sensors. The center sensor senses electrical characteristic change at a center of the track-pad device. The plurality of radial sensors sense electrical characteristic changes in the respective vicinity of each of the plurality of radial sensors. The plurality of radial sensors can be configured in concentric rings about the center sensor.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention may include radial track-pad systems and methods which are described herein. Track-pad sensors are arranged in patterns compatible with radial sensing. In one embodiment, a radial track-pad device can track one or more activators and supply information sufficient to facilitate resolution of a single or multiple activators without phantom positions being reported. In one exemplary implementation, the information includes polar coordinate information. For example, the measured information can include a radius and angle indication. In situations requiring X-Y coordinate designation, a polar to rectangular conversion can be performed.

Figure 2:
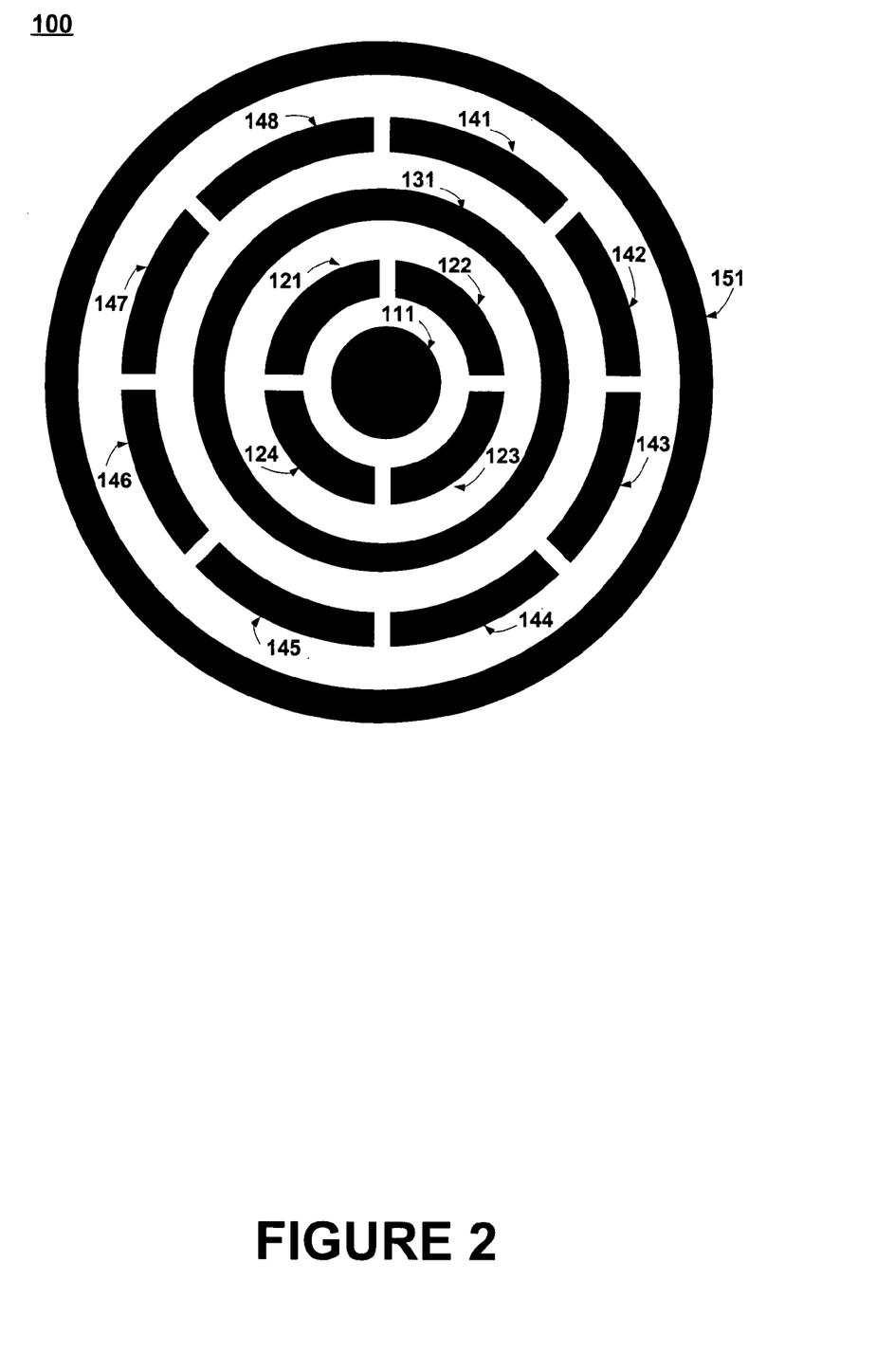
FIG. 2 is a block diagram of an exemplary radial track-pad device in accordance with one embodiment of the present invention.

FIG. 2 is a block diagram of an exemplary radial track-pad device 100 in accordance with one embodiment of the present invention. In one embodiment, radial track-pad device 100 includes one or more radial sliders with multiple radial sensors. In one exemplary implementation, during a measurement cycle each radial slider is tied together to form additional radial sensors. Radial track-pad device 100 can facilitate resolution of a single or multiple activation interactions essentially simultaneously.

Track-pad device 100 includes a center sensor 110, a plurality of radial sensors 121, 122, 123, 124, 141, 142, 143, 144, 145, 146, 147 and 148, and solid sensors 131 and 151. The components of track pad device 100 co-operatively operate to sense activator interactions including interactions directed at data input indications. Center sensor 110 senses electrical characteristic changes at a center of the track-pad device. The plurality of radial sensors 121 through 124 and 141 through 148 sense electrical characteristic changes in the respective vicinity of each of the respective radial sensors. In one embodiment, the plurality of radial sensors are configured in concentric rings about the center sensor.

In one embodiment, each of the concentric rings include more than one of the plurality of radial sensors and each of the plurality of sensors is configured to correspond to an angular portion of the concentric ring. In one exemplary implementation, track pad device 100 includes a solid sensor (e.g., 131, 151, etc.) for sensing electrical characteristic changes in the vicinity of the solid sensor and the solid sensor is intermixed between the concentric rings of radial sensors (e.g., 121-124 and 141-148). It is appreciated that the sensors of track pad device 100 can be configured to sense a variety of electrical characteristics. The electrical characteristics can correspond to a capacitance measurement or change, a conductance or resistance measurement or change, etcetera. In one exemplary implementation, the electrical characteristic changes are caused by an activator (e.g., finger, stylus, etc.) in the vicinity of the track pad device 100.

In one embodiment, track pad device 100 sensing is associated with a position of an activator. In one exemplary implementation the sensing is associated with a position of an activator relative to locations formed by the center sensor, the plurality of radial sensors and/or solid sensors. Changes in the position of the activator to a sensor causes change in the electrical characteristic measured by the sensor. In one embodiment, as an activator get closer to a sensor an increase in the electrical characteristic (e.g., capacitance, resistance, conductance, induction, etc.) is measured. The position of the activator can be designated in a radial or polar coordinate notation.

It is appreciated the sensing or measurements can be associated with a plurality of functions. The functions can be independent of one another. In one embodiment, the sensing is associated with independent scrolling of a screen and movement of a cursor on the screen. The sensing can be associated with controlling a variety of functions including audio volume, application activation, zooming, panning, scrolling, cursor movement; selection and movement of icons, images, text, and etcetera.

It is also appreciated that multi-touch functionality can be facilitated. In one embodiment, if a first activator is sensed a first function is implemented and if a second activator is sensed a second function is implemented. In one exemplary implementation, if a single finger activator is sensed moving right to left a first function (e.g., moving a cursor right to left) is performed and if two finger activators are sensed moving right to left a second function (e.g., raising audio volume) is performed. The multi-touch functionality can be utilized to facilitate selection of an item (e.g., icon, image, text, etc.). In one exemplary implementation, a first activator finger information is utilized to move a cursor to an item, a second activator finger information is utilized to select the item. Information indicating a direction to activate or launch an application associated with the item can be initiated by movement of the second activator or touching the second activator finger twice within a certain period of time. Information indicating a direction to activate or launch an application associated with the item can be initiated by sensing a third activator finger.

It is also possible to permit a user to grip or hold a device (e.g., hand held computer, music player, video game, etc.) by placing a finger involved in the holding over a portion of the track pad while tracking another finger involved in another function (e.g., cursor guidance, volume control, scrolling, etc.). In one exemplary implementation, the finger holding the device is essentially a stationary activator and the input from the stationary activator while sensed is essentially ignored and does not interfere with the input from the second activator that is directed to performing the other function.

In one embodiment, a radial track-pad is partitioned into a plurality of regions or areas and each of the regions is associated with a respective function. In one exemplary implementation one side, edge or area of the track pad functions as a vertical scroll control area and another side, edge or area of the track-pad functions as a horizontal scroll control area and a remaining main bulk area or partition can be a cursor movement control area. The side, edge or area partitions can have a variety of configurations including top, bottom, right, left, diagonal, circular, oval, center portions of a track-pad.

Figure 3A:
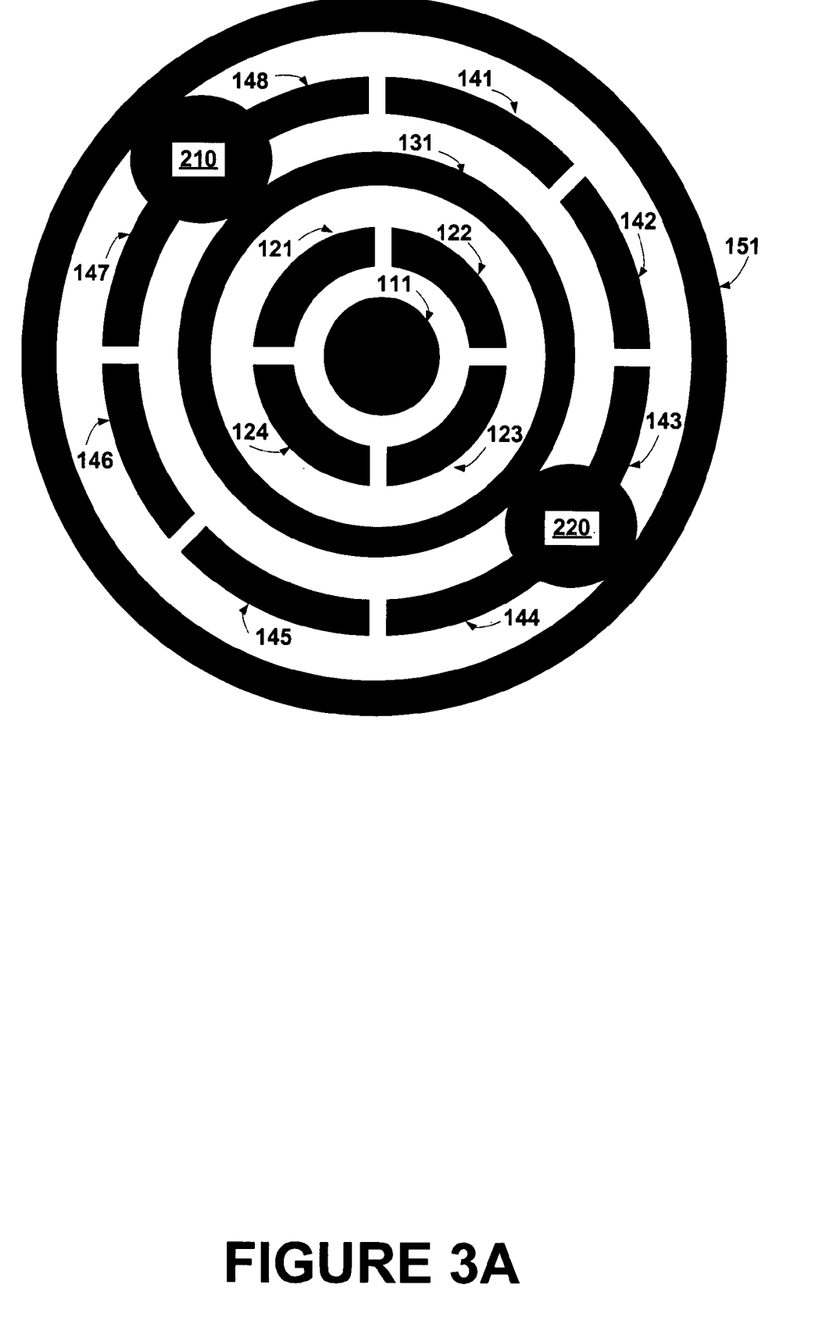
FIG. 3A is a block diagram of an exemplary track pad device interfacing with activators in a first configuration in accordance with one embodiment of the present invention.

FIG. 3A is a block diagram of track pad device 100 interfacing with activators in an exemplary first configuration in accordance with one embodiment of the present invention. Activators 210 and 220 cause electrical characteristic interactions which are sensed by the radial sensors and solid sensors of track pad device 100. It is appreciated that the activators can be a number of different objects for interfacing with the track-pad. For example, the activators can be a finger, a stylus, etc.

In one embodiment, the greater the electrical characteristic impact on a sensor indicates the proximity in location of an activator to the sensor. As activators are moved in proximity the electrical characteristic impact is altered. In one exemplary implementation, correlations are established between changes in the electrical characteristics measured by the sensors and relative positions of activators to the sensors.

Figure 3B:
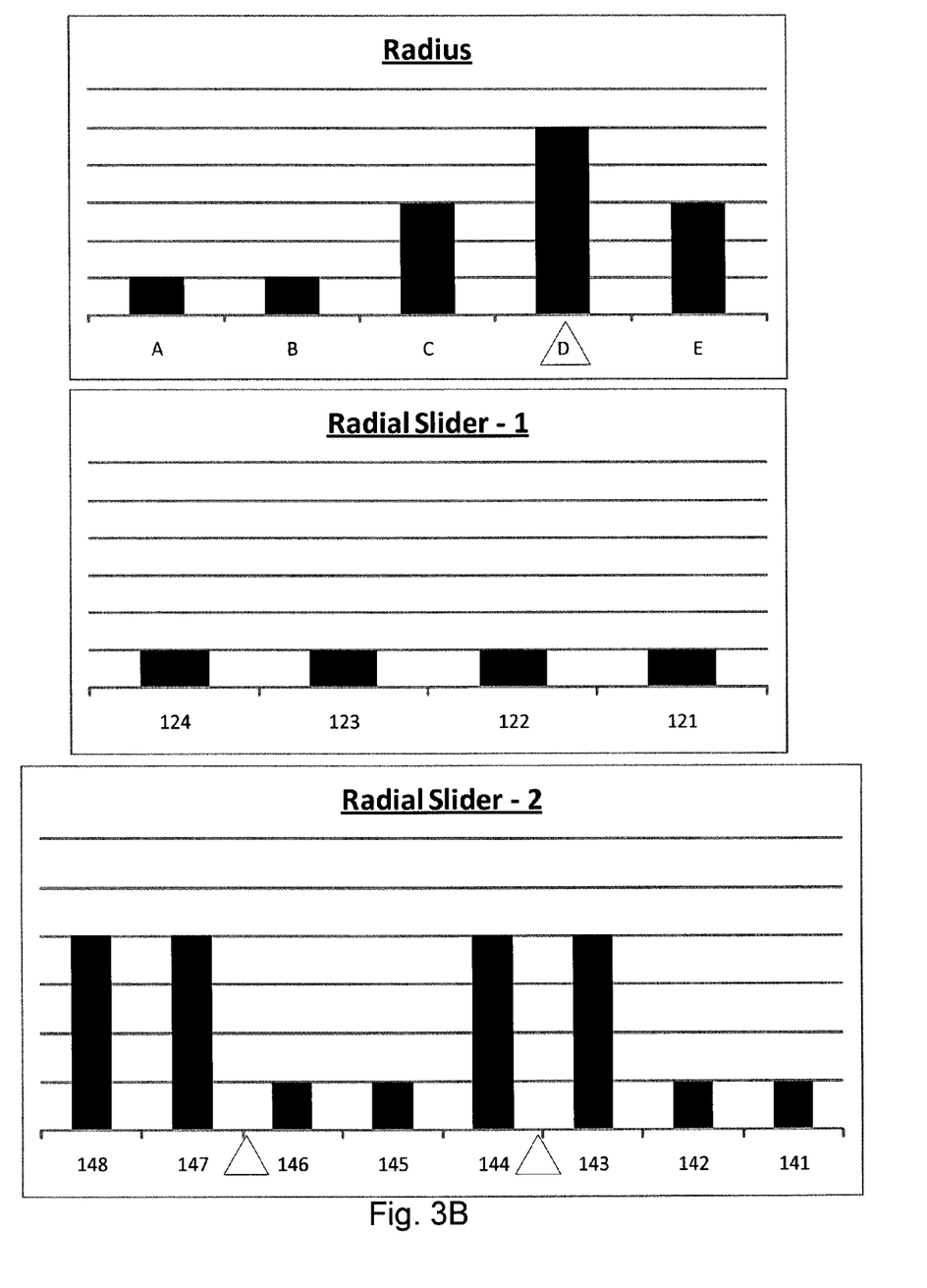
FIG. 3B is an exemplary graphical representation of the sensing or measurement of the interfacing by the activators in the first configuration in accordance with one embodiment of the present invention.

FIG. 3B is a graphical representation of exemplary sensing or measurement of the interfacing by the activators. In one embodiment, the Y axis corresponds to amplitude changes in electrical characteristics. In the radius graph the X axis corresponds to the concentric rings A, B, C, D, and E. Concentric ring A includes center sensor 111, concentric ring B includes radial sensors 121, 122, 123, and 124, concentric ring C includes solid sensor 131, concentric ring D includes radial sensors 141 through 148, and concentric ring E includes solid sensor 151. As shown in the radius graph activators 210 and 220 are having the largest electrical characteristic impact on concentric ring D, some impact on concentric ring C and E, and minimal impact on concentric rings A and B. The radial slider 1 graph indicates the electrical characteristic impact of activators 210 and 220 on the radial sensors 121 through 124. As shown in FIG. 3B the activators 210 and 220 have no or little impact on the radial sensors 121 through 124. The radial slider 2 graph indicates the electrical characteristic impact of activators 210 and 220 on the radial sensors 141 through 148. As shown in FIG. 3B the activator 210 has the most electrical impact on radial sliders 147 and 148 and activator 220 has the most impact on radial sliders 143 and 144.

Figure 4A:
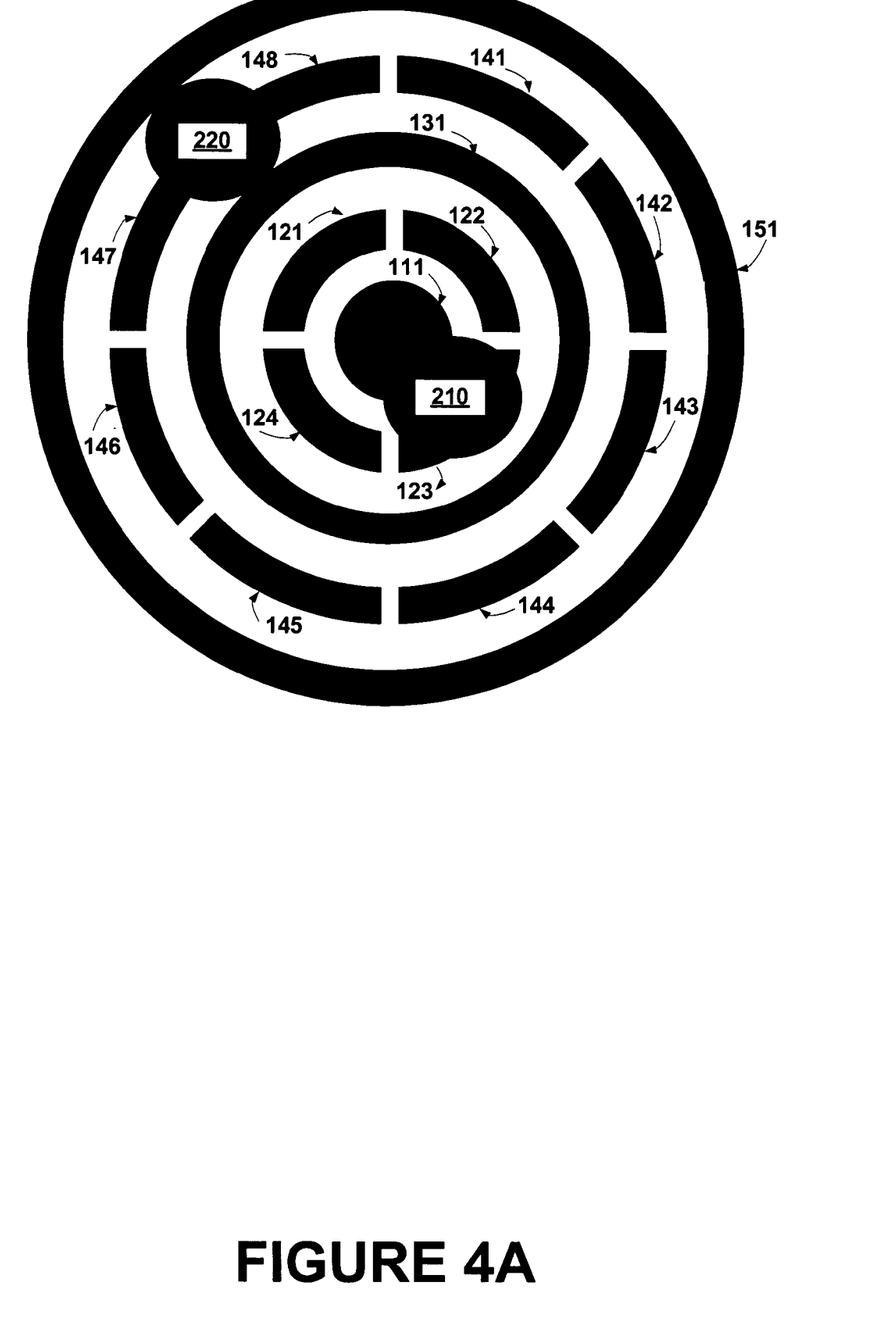
FIG. 4A is a block diagram of an exemplary track pad device interfacing with activators in a second configuration in accordance with one embodiment of the present invention.
Figure 4B:
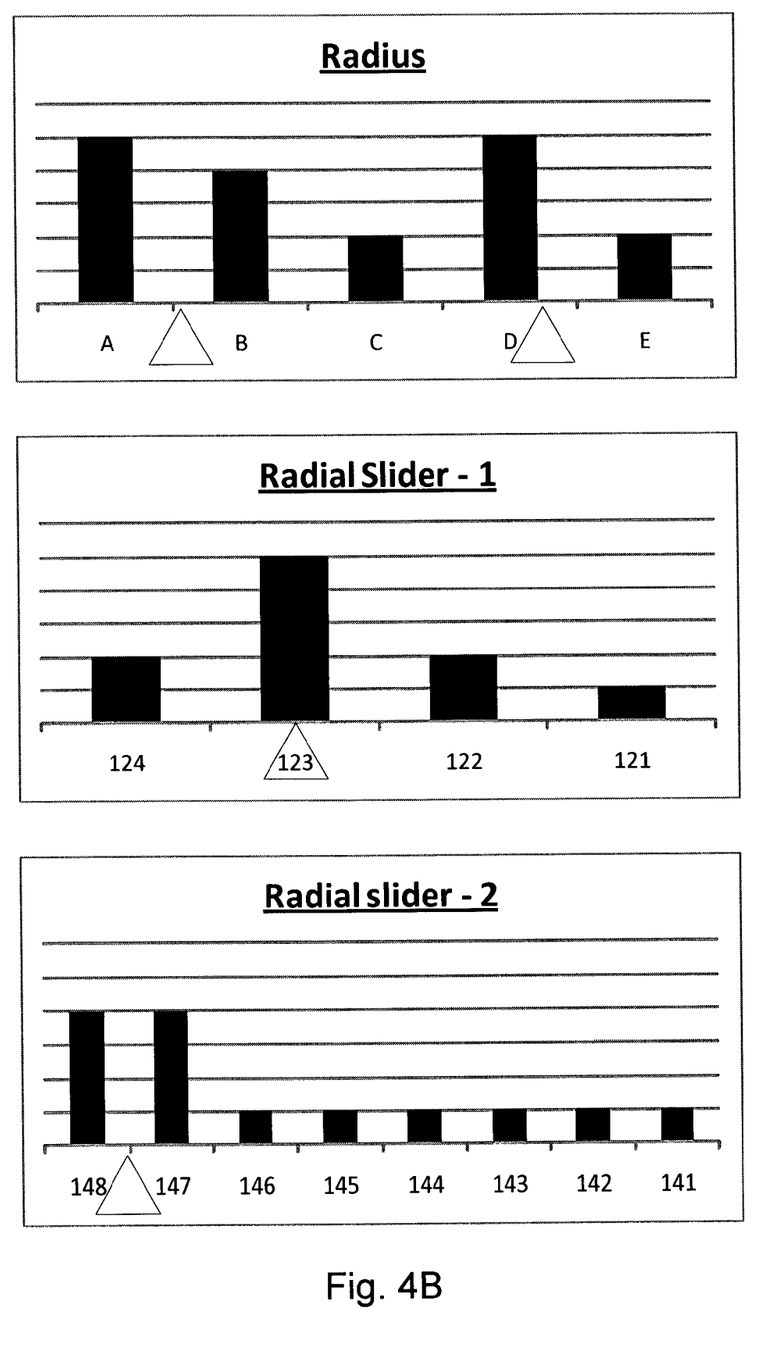
FIG. 4B is an exemplary graphical representation of the sensing or measurement of the interfacing by the activators in the second configuration in accordance of the present invention.

FIG. 4A is a block diagram of track pad device 100 interfacing with activators in an exemplary second configuration in accordance with one embodiment of the present invention. FIG. 4B is a graphical representation of exemplary sensing or measurement of the interfacing by the activators in the second configuration. As shown in the radius graph of FIG. 4B, activator 220 is having the largest electrical characteristic impact on concentric ring D and some impact on concentric rings C and E with minimal impact on concentric rings A and B. Activator 210 is having the largest electrical characteristic impact on concentric rings A and B with minimal impact on concentric rings C, D, and E. As shown in the radial slider 1 graph of FIG. 4B the activator 210 has the greatest impact on radial slider 123 and some impact on radial sliders 122 and 124 and no or little impact on radial sensor 121. Activator 220 has no or little impact on the radial sensors 121 through 124. The activator 220 has the most electrical impact on radial sliders 147 and 148 and no or minimal impact on radial sliders 141 through 146.

Figure 5A:
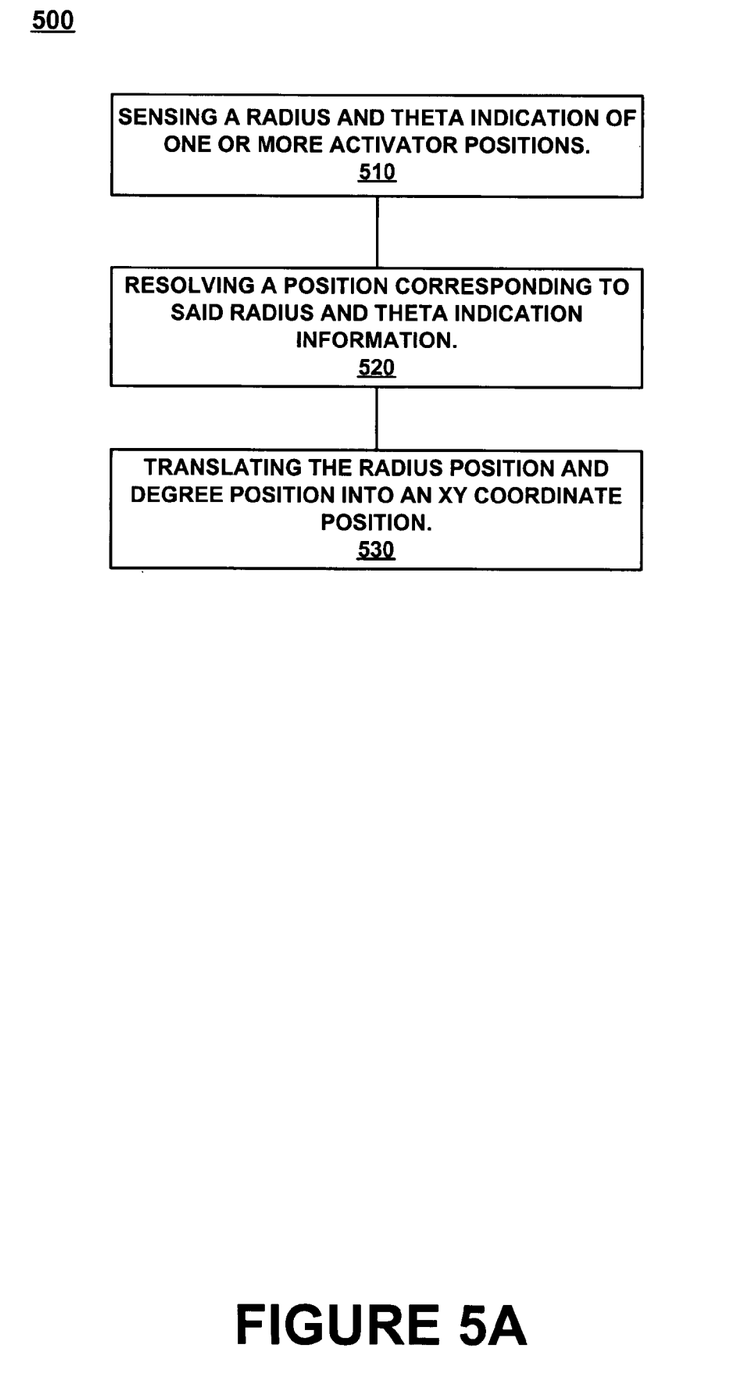
FIG. 5A is a flow chart of an exemplary input sensing method in accordance with one embodiment of the present invention.

FIG. 5A is a flow chart of input sensing method 500 in accordance with one embodiment of the present invention.

In step 510, a radius and theta indication of one or more activator positions are sensed. The radius and theta indication information is associated with multiple interactions. In one embodiment, the radius and theta indication information is associated with an electrical characteristic measurement. In one exemplary implementation the electrical characteristic measurement is from a radial slider.

In step 520, a position corresponding to the radius and theta indication information is resolved. In one embodiment the resolving includes resolving multiple positions associated with said multiple interactions. In one exemplary implementation the resolving includes determining a radius distance from the center associated with the radius and theta indication information; and determining an angular position associated with the radius and theta indication information. The angular position determination can include performing interpolation of the theta indication information.

In step 530, the radius position and degree position are translated into an XY coordinate position. In one embodiment, a polar to rectangular conversion can be performed. In one exemplary implementation, sine and cosine computations are performed.

Figure 5B:
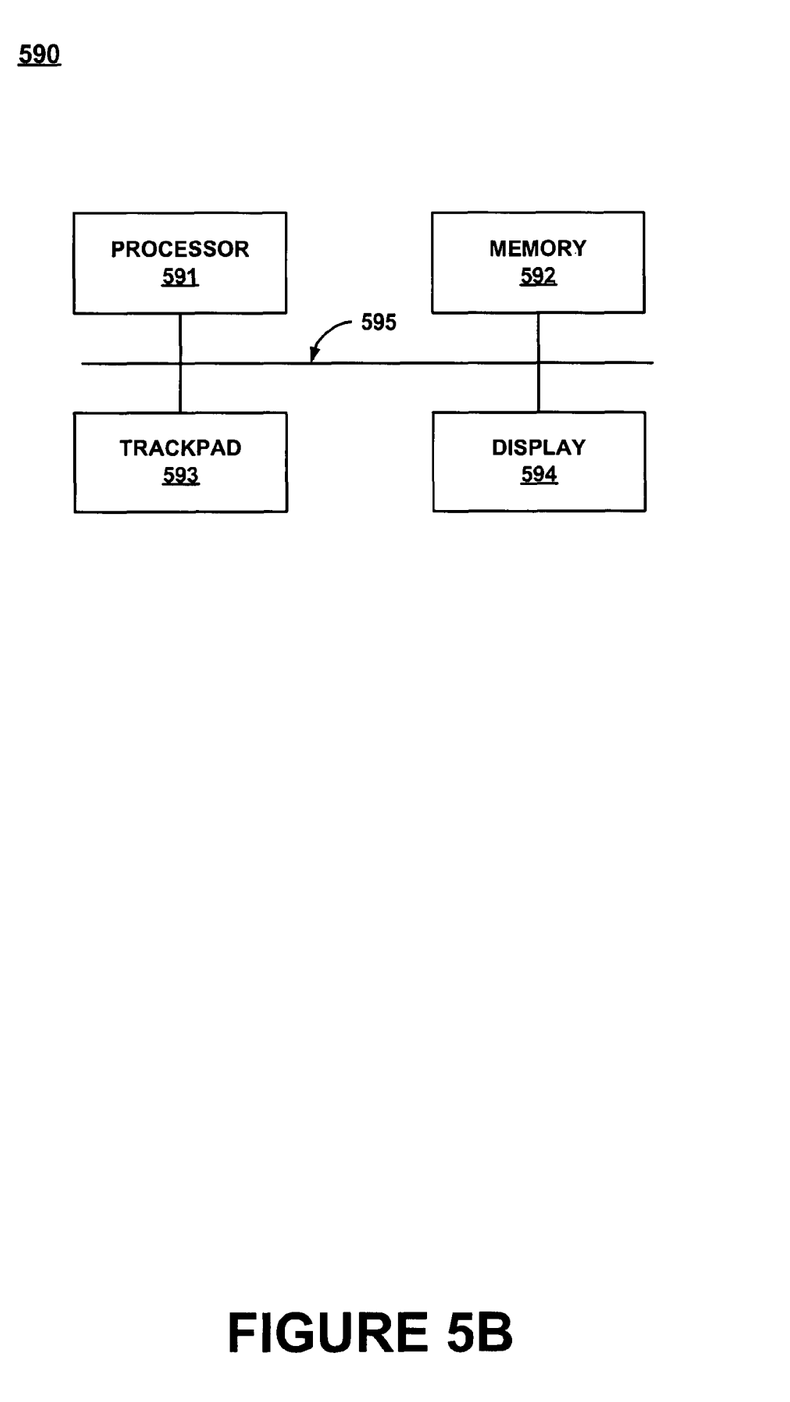
FIG. 5B is a block diagram of an exemplary track pad computer system in accordance with one embodiment of the present invention.

FIG. 5B is a block diagram of exemplary track pad computer system 590 in accordance with one embodiment of the present invention. Exemplary track pad computer system 590 includes processor 591, memory 592, radial track pad component 593, display 594 and bus 595. Processor 591, memory 592, radial track pad component 593, display 594 are coupled to bus 595. Radial track pad component 593 tracks a position of one or more activators. Memory 592 is for storing information including instructions for processor 591. In one embodiment, memory 592 store instructions for directing processor 591 in the performance of a track pad method. It is appreciated that memory 592 can include a variety of storage components including a main memory, bulk storage memory, removable memory, read only memory (ROM), random access memory (RAM), hard drive, flash memory, CD disk, etc. Processor 591 is for processing input information associated with the position of the activators. Display 594 is for displaying information that is navigated in accordance with the position of the activator. It is appreciated that track pad computer system 590 is readily adaptable for a variety of configurations and compatible with numerous different features. In one exemplary implementation, exemplary track pad computer system 590 can also include an alphanumeric input component (e.g., a keyboard, etc.), an audio input component (e.g., microphone, etc.) and audio output component (e.g., speaker, etc.), and a network communication component (e.g., communication port, antenna, etc,) for communicating with a network.

The position of the activators can be associated with one or more respective functions. The radial track-pad can be partitioned into a plurality of regions and each of the regions is associated with a respective function.

In one embodiment, the fundamentals of the interaction of a single activator is the same from an end user perspective. In one exemplary implementation, movements of an activator on a track-pad correspond to movements of a cursor on a display. For example, moving an activator from left to right on a track-pad is utilized to move a cursor from left to right on a display and moving the activator from top to bottom on a track pad is utilized to move a cursor from left to right on the display. One activator can be utilized to move one cursor and another activator can be utilized to move another cursor. For example, a first finger activator that is moved left to right on the track-pad or top to bottom can be utilized to move a first cursor correspondingly from left to right or top to bottom on the display screen and a second finger activator that is moved in a circular motion on the track-pad can be utilized to move a second cursor in a corresponding circular motion on a display screen.

Thus, embodiments in accordance with the present invention provide systems and methods for facilitating single or multiple activator interaction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A track-pad device comprising:
 a center sensor configured to sense electrical characteristic change at a center of the track-pad device; and a plurality of concentric rings configured about the center sensor, wherein the plurality of concentric rings comprises:
  a first concentric ring formed by a solid sensor to sense electrical changes in the respective vicinity of the solid sensor;
  a second concentric ring formed by a plurality of radial sensors configured to sense electrical characteristic changes in the respective vicinity of each of the plurality of radial sensors, wherein the plurality of radial sensors form the second concentric ring having gaps between the plurality of radial sensors; and
  a third concentric ring formed by a second plurality of radial sensors configured to sense electrical characteristic changes in the respective vicinity of each of the second plurality of radial sensors, wherein the first concentric ring is disposed between the second and third concentric rings.

2. The track-pad device of claim 1, wherein each of the plurality of radial sensors is configured to correspond to an angular portion of the second concentric ring.

3. The track-pad device of claim 1 wherein the electrical characteristic corresponds to a capacitance change.

4. The track-pad device of claim 1 wherein the track-pad device is configured to sense a position of an activator relative to locations formed by the center sensor and the plurality of concentric rings.

5. The track-pad device of claim 4 wherein the position is designated in a radial coordinate notation.

6. The track-pad device of claim 1 wherein the sensing performed by the track-pad device is associated with a plurality of functions.

7. The track-pad device of claim 1 wherein the sensing performed by the track-pad device is associated with at least one of independent scrolling of a screen and movement of a cursor of a cursor on the screen.

8. An input sensing method comprising;
  sensing a radius and angle indication of one or more activator positions on a radial track-pad, wherein the sensing comprises:
    sensing electrical characteristic changes in the respective vicinity of a center sensor located in the center of the radial track-pad; and
    sensing electrical characteristic changes in the respective vicinity of a plurality of concentric rings configured about the center sensor, wherein the plurality of concentric rings comprises:
      a first concentric ring formed by a solid sensor to sense electrical changes in the respective vicinity of the solid sensor;
      a second concentric ring formed by a plurality of radial sensors, wherein plurality of radial sensors form the second concentric ring having gaps between the plurality of radial sensors; and
      a third concentric ring formed by a second plurality of radial sensors configured to sense electrical characteristic changes in the respective vicinity of each of the second plurality of radial sensors, wherein the first concentric ring is disposed between the second and third concentric rings; and
  resolving a position corresponding to the radius and angle indication information.

9. The method of claim 8 wherein the radius and angle indication information is associated with multiple interactions of the one or more activator positions.

10. The method of claim 9 wherein the resolving comprises resolving multiple positions associated with the multiple interactions.

11. The method of claim 10 wherein the resolving comprises:
  determining a radius distance from the center associated with the radius and angle indication information; and
  determining an angular position associated with the radius and angle indication information.

12. The method of claim 8 wherein the determining angular position includes performing interpolation of the angle indication information.

13. The method of claim 8 wherein the radius and angle indication information is associated with an electrical characteristic measurement.

14. The method of claim 9 further comprising translating the radius position and degree position into an XY coordinate position.

15. A track-pad system comprising:
  a radial track-pad component for tracking a position of one or more activators, the radial track-pad component comprising:
    a center sensor configured to sense electrical characteristic change at a center of the track-pad component; and
    a plurality of concentric rings configured about the center sensor, wherein the plurality of concentric rings comprises:
      a first concentric ring formed by a solid sensor to sense electrical changes in the respective vicinity of the solid sensor;
      a second concentric ring formed by a plurality of radial sensors configured to sense electrical characteristic changes in the respective vicinity of each of the plurality of radial sensors, and wherein the plurality of radial sensors form the second concentric ring having gaps between the plurality of radial sensors; and
      a third concentric ring formed by a second plurality of radial sensors configured to sense electrical characteristic changes in the respective vicinity of each of the second plurality of radial sensors, wherein the first concentric ring is disposed between the second and third concentric rings;
  a processor for processing input information associated with the position of the one or more activators; and
  a bus for communicating information between the radial track-pad component and the processor.

16. A track-pad system of claim 15 wherein the position of the one or more activators is associated with one or more respective functions.

17. A track-pad system of claim 16 wherein the radial track pad component is partitioned into a plurality of regions and each of the regions is associated with a respective function.

18. A track-pad system of claim 17 further comprising a display for displaying information that is navigated in accordance with the position of the activator.

* * * * *